(12) United States Patent
Yu

(10) Patent No.: US 7,592,717 B2
(45) Date of Patent: Sep. 22, 2009

(54) POWER MAINS DATA TRANSFER SYSTEM

(75) Inventor: Hong Yu, Hollis, NH (US)

(73) Assignee: Aboundi, Inc., Nashua, NH (US)

( * ) Notice: Subject to any disclaimer, the term of this patent is extended or adjusted under 35 U.S.C. 154(b) by 161 days.

(21) Appl. No.: 11/731,898

(22) Filed: Apr. 2, 2007

(65) Prior Publication Data
US 2008/0238204 A1    Oct. 2, 2008

(51) Int. Cl.
*H02J 7/00* (2006.01)
(52) U.S. Cl. .......................... 307/66; 455/572
(58) Field of Classification Search ............ 307/64–66; 700/79; 455/572
See application file for complete search history.

(56) References Cited

U.S. PATENT DOCUMENTS 6,952,631 B2 * 10/2005 Griffith et al. ............... 701/13
7,272,464 B1 * 9/2007 Jurewicz, Jr. ............... 700/182

* cited by examiner

*Primary Examiner*—Albert W Paladini
(74) *Attorney, Agent, or Firm*—Joanne M. Martin

(57) ABSTRACT

A power mains data transfer system according to one embodiment of the present invention comprises a data transceiver, a first data path to the power mains over which a data path is maintained, and a second, power path connected to the UPS output and provides a connection from which data transceiver operating power is derived. Various further embodiments provide multiple data equipment data input/output and/or power connections, and optional internal switching and filtering features. Thus, according to the present invention, an apparatus is provided for reliable data transfer over power mains even when there is an interruption in the mains' data integrity, e.g. via a UPS device, there along.

24 Claims, 3 Drawing Sheets

POWER MAINS DATA TRANSFER SYSTEM

FIELD OF THE INVENTION

The present invention relates to apparatus for data transmission over media having a non-data function, in particular bidirectional data transmission over power mains having a data blocking element, e.g. a UPS device therein.

BACKGROUND OF THE INVENTION

Devices exist which provide bidirectional data over power mains (e.g. building infrastructure AC power wall outlets and wiring providing the power to them) such as described in copending application Ser. No. 10/871,361, incorporated by reference. The apparatus describe therein, as well as other devices, are operable only so long as the path of the power mains has sufficient fidelity in the range of signals that the apparatus or devices apply and receive their data signals, such as within the range of 1-50 MHz. various data-over power line standards and protocol, i.e. HomePlug, Universal Powerline Association (UPA). However, in many building applications, the path between power mains and data equipment passes through an Uninterruptible Power Supply (UPS) which intentionally, such as with internal filtering, or accidentally degrades the data signal path to make power mains devices which are intended to pass data over the power main, e.g. power mains data transceivers, inoperable.

SUMMARY OF THE INVENTION

The power mains data transfer system according to one embodiment of the present invention comprises a data transceiver, a first data path to the power mains over which a data path is maintained, and a second, power path connected to the UPS output and provides a connection from which data transceiver operating power is derived. Various further embodiments provide multiple data equipment data and/or power connections, and optional internal switching and filtering features.

Thus, according to the present invention, an apparatus is provided for reliable data transfer over power mains even when there is a data interruption, e.g. a UPS device or another form of data blocking element, there along.

BRIEF DESCRIPTION OF THE DRAWING

These and further features of the present invention will be better understood by reading the following Detailed Description together with the Drawing, wherein.

DETAILED DESCRIPTION OF EXEMPLARY EMBODIMENTS

Figure 1:
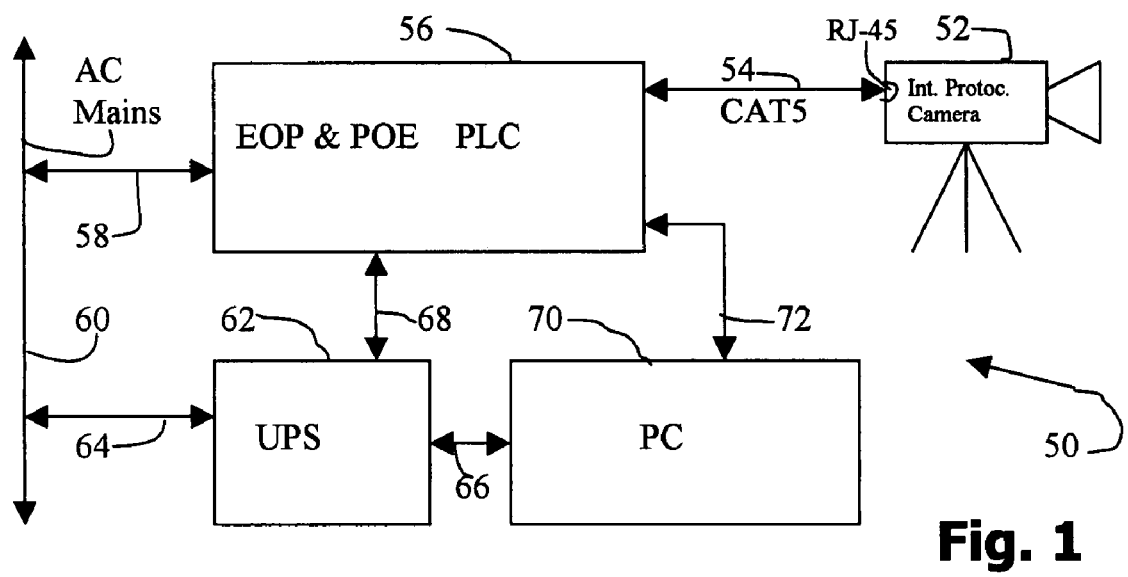
FIG. 1 is a block diagram of one embodiment of the present invention.

The embodiment 50 of FIG. 1 broadly shows a source of data, e.g. an internet protocol camera 52 having a digitized output (and optionally also receiving digital control signals) connected to a Power Line Communication (PLC) engine or transceiver 56 via CAT5 (or equivalent) cable 54, the camera 52 may also be adapted to receive operating power over the CAT5 connection from the transceiver. The transceiver 56 communicates the source data to another device (not shown) over the AC Power Mains 60 (or other media not originally intended to pass data thereover, via a signal path connected to the mains 60, such as an AC power cord 58 plugged into a wall outlet. The transceiver comprises a data engine configured to provide the source equipment data in a format compatible and accessible to the other device, e.g. the protocol described in the HomePlug™ Power Alliance, Inc. "White Paper", document number HPAVWP-050818, or equivalent or analogous protocol or format, and may provide "Ethernet Over Power line" (EOP) structure and/or functionality as defined by various IEEE or other standards. Additionally, the Transceiver 56 may optionally provide power to the data source 52 connected thereto, and may provide "power over Ethernet" (POE) structure and/or functionality.

Often the data environment has insufficient power line or mains reliability or quality, and incorporates an Uninterruptible Power Supply (UPS) 62 having an input connected to the mains socket 60 by a power cord, 64. The UPS 62 typically has several outlets to which powered equipment (e.g. a computer 70 and the transceiver 56) are connected by appropriate power cables, 66 and 68. In the embodiment 50 of FIG. 1, the transceiver 56 has a further equipment data connection to which the computer 70 is connected via data path 72, typically, but not necessarily comprising a bidirectional data path.

Figure 2:
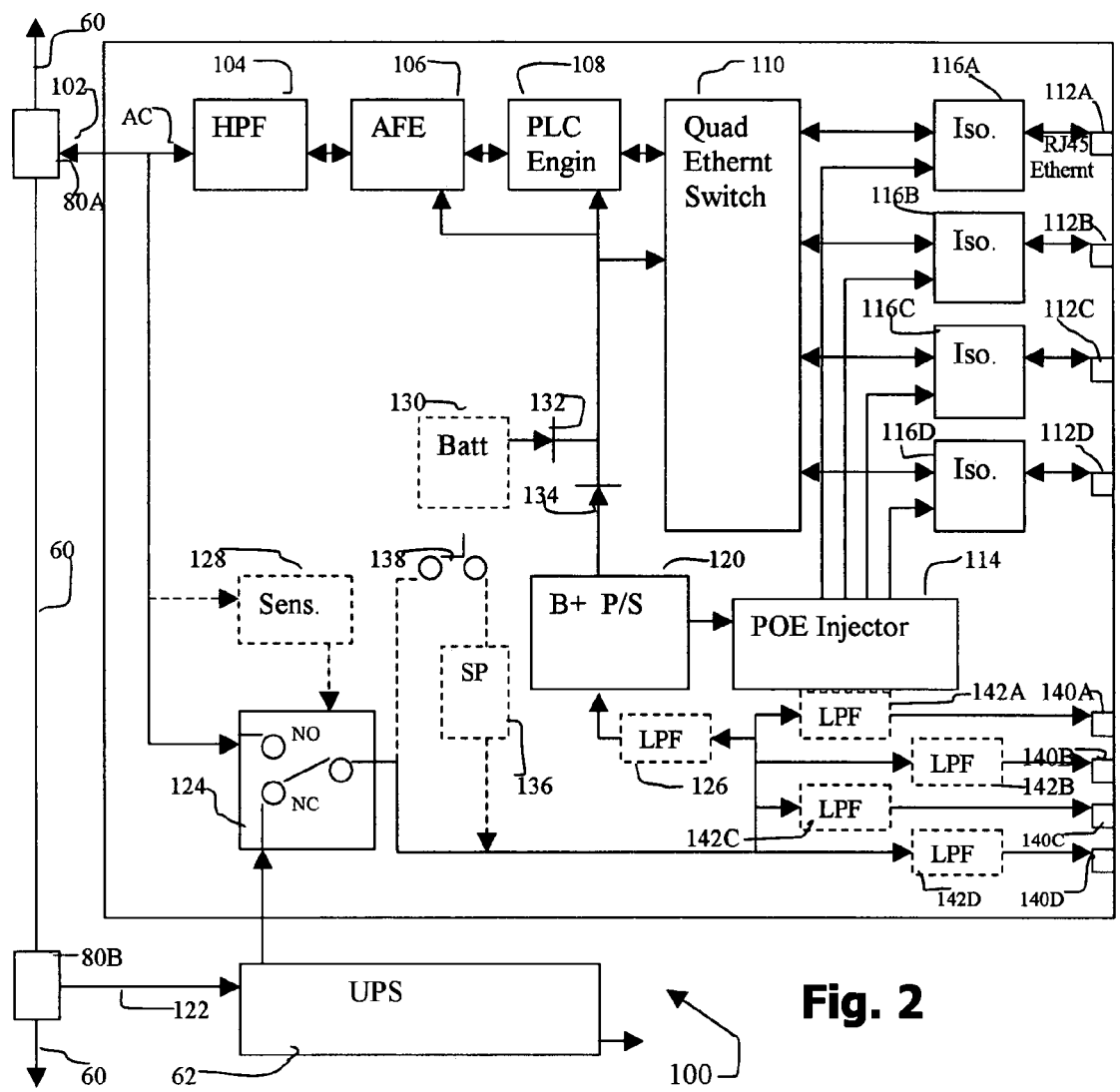
FIG. 2 is a more detailed block diagram of an alternate embodiment of the present invention.

The embodiment 100 of FIG. 2 provides additional features and details of an exemplary embodiment. The power line or mains 60 is shown with outlets 80A and 80B disposed there along, and may include separate branch circuits having a common junction with sufficient data signal coupling to maintain acceptable fidelity of data transmission there over in the signal range of interest for the protocol or format of the transceiver (106&108, or 56 of FIG. 1).

A connection is made between a bidirectional high pass filter (HPF) 104 and the mains outlet 80A via connector 102, wherein the HPF 104 removes much if not all of the AC power (and other low frequency) signals leaving the path intact for signals corresponding to the data signals applied there over. The other side of the HPF 104 is connected to an analog front end (AFE) 106 which applies the digital signal generated by the transmitter portion of the PLC transceiver 108 to the mains 60 as a suitably conditioned signal, and provides a suitably conditioned (e.g. amplified/attenuated, shaped, etc.) return path from the mains 60 to the receiver portion of the PLC transceiver 108. The PLC transceiver 108 can communicate directly with connected data equipment (not shown) connected to jack 112A or other suitable connector, or may be connected to multiple other data equipment (also not shown) by jacks 112B-112D via a data switch 110 or equivalent.

In the embodiment 100 of FIG. 2, a further feature provides the injection of power onto the connected data equipment from a power supply 120, which also powers the HPF 104 (if necessary), the AFE 106, the PLC transceiver 108 and the Switch 110. One exemplary embodiment includes a power source injector circuit 114 to provide the appropriate power, and an isolation circuit 116 typically including an isolation transformer or equivalent, to pass the data between the connected data equipment and the switch 110 and the power flowing to the data equipment, while preventing the supplied power from improperly flowing to the switch 110. The power supply 120 is itself powered from the mains outlet 80B via a UPS 62 and power cord 122 directly, or via an optional low pass filter 126, or optionally via a switch 124 which is operator selectable to receive power from mains outlet 80A or UPS 62. In the event of a mains failure, the UPS assumes the function of the mains by providing a mains-like AC output to which the data equipment (not shown) and the power supply 120 is typically connected. However, in the event that the UPS start-up and transition is sufficiently erratic as to cause the power supply output to excessively fluctuate or diminish, a further feature according to the present invention provides a battery (or other source of power) to be sent to the circuits otherwise powered by the power supply, as illustrated in an form by diodes 132 and 134 which exemplify a switching or steering of the powering of the circuits from power supply 120 to the battery (or equivalent) 130 and back again as the power supply once again resumes its nominal power output. Other switching or steering circuits are also applicable herein by one skilled in the art and according to the teaching of the present invention.

A further feature of the present invention provides one or more mains AC outlets (140A-140D) from the UPS 62 via cord 122, or optionally selectably from either the mains outlet 80A (before the UPS 62) or after the UPS 62 according to operator selection by switch 124. In an alternate embodiment, the switch 124 is automatically controlled with according to a power sense circuit 128 which connects the outlets (140A-140D) to the mains 60 before the UPS according to a power sense signal provided when the mains before the UPS does in fact have mains power thereon. Moreover, the mains power to each outlet (140A-140D) is filtered by a corresponding low pass filter (LPF) 142A-142D. In addition, a transient or other power mains conditioning filter 136 and/or a circuit breaker 138 (or fuse) may be serially connected between the mains (or UPS output) and the outlets (140A-140D) or optional corresponding LPF 142A-142D, and may optionally feed the LPF 126 or directly the power supply 120.

Figure 3:
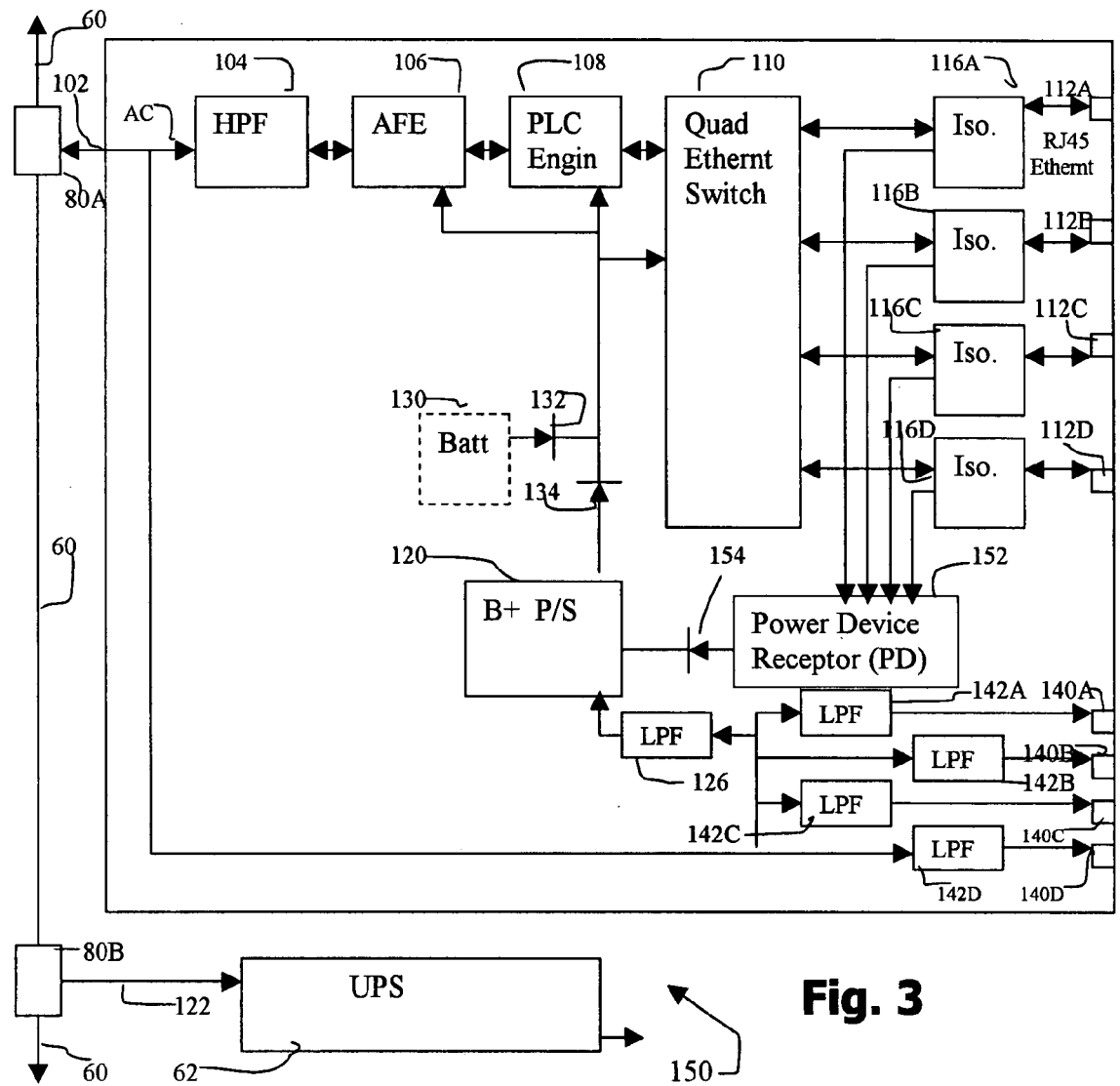
FIG. 3 is a more detailed block diagram of a further alternate embodiment of the present invention.

A further alternate embodiment 150 of the present invention is shown in FIG. 3, wherein local transceiver power is derived from the connected equipment (which provide power over the connections to the present embodiment and remain powered via the UPS 62, battery backup or other source, not shown) via the connectors 112A-112D and power isolators 116A-116D which provide a data path between the ethernet switch 110 and the respective connector without the power appearing at the switch 110, while connecting a power path to a Power Over Ethernet (POE) power device receptor 152 which abstracts some 'raw' power from the connections 112A-112D to be sent through power supply 120, or optionally directly to the local transceiver loads (e.g. HPF 104, AFE 106, PLC Engine 108, Quad Ethernet Switch 110) via a suitable power switching or steering device, shown by an exemplary diode 154. Thus, the embodiment 150 of provides power to the local transceiver loads when mains 60 power fails and the power supply 120 and/or the optional battery 130 provide no or insufficient power. If the internal transceiver loads are different from or require conditioning or regulation, the power received from the connectors 112A-112D via the isolators 116A-116D are accordingly converted or processed by the POE receptor 152 and/or power supply 120. The AC power receptacles 140A-140D are shown connected via optional LPFs 142A-142D to the mains power outlet 80A via connector 102. Although shown without some of the feature, e.g. the connection to the UPS 62 directly or via the controlled switch 124, of the embodiment 100 of FIG. 2, such features may be added entirely or in part according to the teaching of the present invention by one of ordinary skill in the art.

Alternate embodiments foresee the application of the features of the present invention to systems including a power line conditioner (not shown) and/or other devices in place of or in addition to (serially inserted) the connection between the cord 122 and the outlet 80B. Moreover, the outlets 140A-140D may be co-located with the connectors 112A-112D or separated. Alternate data signal splitting/combining/multiplexing apparatus may be substituted for the switch 112, as may the number of connections and data paths to data equipment be changed in number and type according to one of ordinary skill and the teaching of the present invention. Also, the present invention includes embodiments having 1-way data transfers, i.e. the transceiver is a data transfer device comprising one of a data receiver and a data transmitter. Furthermore, components, terms and standards provided in the exemplary embodiments herein, e.g. RJ45, CAT5, Ethernet, etc. are not limiting, and may be read to also include future standards, terms and components. Further modifications and substitutions made by one of ordinary skill in the art are within the scope of the present invention, which is not to be limited except by the claims that follow.

What is claimed is:

1. For use in systems having a power mains Uninterruptible Power Source (UPS) connected to said power mains and providing a UPS output, a data transfer system comprising:
   a data transceiver having a first port, and a second port for connection to data equipment, said data transceiver provides data transfer between said first port and said second port;
   a first signal path between said power mains and said transceiver first port for sending and receiving data there over, wherein said data transceiver and said first signal path provides data flow between said power mains and said data equipment; and
   means for providing operating power to said data transceiver derived from said UPS output.

2. The data transfer system of claim 1, wherein said means for providing operating power comprises a power supply connected to said UPS output.

3. The data transfer system of claim 2, further including a switch having an output, said switch selectively connects said power supply to one of said power mains and said UPS output.

4. The data transfer system of claim 3, wherein said switch is responsive to a switch control signal, said data transfer system further including:
   a power mains sense circuit to provide said switch control signal to said switch to select said mains power according to the presence of mains power, and select the UPS power according to the absence of mains power.

5. The data transfer system of claim 4, further including at least one mains outlet connected to said switch output.

6. The data transfer system of claim 5, further including at least one of a transient voltage filter, and a selected one of a circuit breaker serially connected between said switch output and said power supply.

7. The data transfer system of claim 1, further including a standby power source connected thereto to provide at least a portion of data transceiver operating power thereto.

8. The data transfer system of claim 7, wherein said standby power source comprises a battery.

9. The data transfer system, of claim 1, further including an Ethernet switch therein having a plurality of data equipment ports for connection to a plurality of data equipment.

10. The data transfer system of claim 1, further including
   a data connector to receive a connection to data equipment, and connected via a second signal path,
   a power injector circuit disposed in said second signal path and to said power supply to provide power over said data connection to said connected data equipment.

11. The data transfer system of claim 10, wherein said power injector circuit comprises a power isolator circuit to provide power over said data connection to said connected data equipment and a power isolated data path over said second signal path.

12. A data transfer system for communicating data signals between data equipment and power mains, comprising:
   a data transceiver having a first port, and a second port;
   a first signal path between said power mains and said transceiver first port for sending and receiving data there over,
   a second signal path between said transceiver second port and said data equipment for sending and receiving data there over and receiving power from said data equipment there over; and
   a power path connected to said second signal path and said transceiver adapted to provide power from said data equipment to said transceiver, wherein
      said data equipment provides electrical power to said data transceiver second port,
      said data transceiver and said first signal path provides data flow between said power mains and said data equipment.

13. The data transfer system of claim 12, further including a power isolator disposed in said second signal path to provide power from said connected data equipment to said transceiver, and an power isolated data path along said second signal path.

14. A method of providing data communication between data equipment and a power mains having a data blocking element therealong, the steps comprising:
   providing a first data path between said mains and a data transfer device;
   providing a second data path between said data equipment and said data transfer device;
   connecting a power supply to a source of power which receives power from said mains, and provides a power output to said data transfer device in the absence of mains power.

15. The method of claim 14, wherein said step of connecting to a power source comprises the step of connecting to an Uninterruptible Power Supply.

16. The method of claim 14, wherein the step of connecting to a power source comprises the step of receiving power from said data equipment.

17. The method of claim 16, further including the step of isolating power received from said data equipment from said data transfer device.

18. The method of claim 14, further including the step of providing power from said source to said data equipment.

19. The method of claim 18, further including the step of providing a plurality of connections to a corresponding plurality of data equipment with a data switch.

20. The method of claim 18, further including the step of isolating power provided to said data equipment from said data transfer device.

21. The method of claim 14, further including the step of providing a backup power source to said data transfer device in the absence of power from said source.

22. The method of claim 14, wherein said step of providing power from a source includes the step of selectively connecting said power supply to said power mains before and after said data blocking element.

23. The method of claim 22, wherein said step of selectively connecting comprises the step of automatically connecting said power supply to said power mains selectively before and after said data blocking element according to the detected presence and absence of power on said mains.

24. The method of claim 22, further including the step of providing a data equipment mains outlet connection to said mains selectively before and after said data blocking element.

* * * * *